US012578920B2

(12) United States Patent
Westendorf et al.

(10) Patent No.: US 12,578,920 B2
(45) Date of Patent: Mar. 17, 2026

(54) AUDIO SYSTEM CONTROL DEVICE

(71) Applicant: Bose Corporation, Framingham, MA (US)

(72) Inventors: Lauren Taylor Westendorf, Waltham, MA (US); Joel Henry Miller, Westborough, MA (US); Jenna Marie Duggan-Lykes, Hyde Park, MA (US); Todd Richard Reily, North Reading, MA (US); Thomas David Chambers, Bellingham, MA (US); Zachary James McHugh, Lunenburg, MA (US)

(73) Assignee: Bose Corporation, Framingham, MA (US)

( * ) Notice: Subject to any disclaimer, the term of this patent is extended or adjusted under 35 U.S.C. 154(b) by 186 days.

(21) Appl. No.: 18/387,144

(22) Filed: Nov. 6, 2023

(65) Prior Publication Data

US 2025/0147714 A1     May 8, 2025

(51) Int. Cl.
*G06F 3/16*          (2006.01)
*G06F 3/0362*        (2013.01)

(52) U.S. Cl.
CPC ............ *G06F 3/165* (2013.01); *G06F 3/0362* (2013.01)

(58) Field of Classification Search
None
See application file for complete search history.

(56) References Cited

U.S. PATENT DOCUMENTS

| | | | | |
|---|---|---|---|---|
| 4,131,033 A | * | 12/1978 | Wright ..................... | G05G 1/02 |
| | | | | 74/504 |
| 2003/0122698 A1 | * | 7/2003 | Horie .................... | G06F 3/0238 |
| | | | | 340/13.24 |
| 2006/0012584 A1 | * | 1/2006 | Vassallo ................. | G06F 3/016 |
| | | | | 345/184 |
| 2019/0107895 A1 | * | 4/2019 | Steinman ............... | G06F 3/165 |
| 2022/0276726 A1 | | 9/2022 | Kos | |

FOREIGN PATENT DOCUMENTS

JP          H02301306 A      12/1990

OTHER PUBLICATIONS

PCT International Search Report and Written Opinion for International Application No. PCT/US2024/051722, dated Jan. 17, 2025, 10 pages.

* cited by examiner

*Primary Examiner* — Hemant S Patel
(74) *Attorney, Agent, or Firm* — Hoffman Warnick LLC

(57)          ABSTRACT

Various implementations include devices and approaches for controlling an audio system. In particular cases, a device with a rotatable feature having distinct operating modes is used to control a remote audio device. The rotatable feature can enable multi-aspect control of audio output at an audio device.

21 Claims, 3 Drawing Sheets

300

| Mode I | | Mode II | | Mode III | |
|---|---|---|---|---|---|
| First Aspect | | Second Aspect | | Third Aspect | |
| First direction 250 | Second direction 260 | First direction 250 | Second direction 260 | First direction 250 | Second direction 260 |
| First input (i) | Second input (ii) | Third input (iii) | Fourth input (iv) | Fifth input (v) | Sixth input (vi) |
| Volume of audio playback, track forward or backward selection, channel forward or backward selection, or skip forward or backward selection | | Feedback about the audio being played on the audio device, beats per minute of the audio being played on the audio device, grouping input for additional audio devices, genre of the audio being played on the audio device, energy level of the audio being played on the audio device, spatialization of the audio being played on the audio device, orchestration of the audio being played on the audio device, focal points of the audio being played on the audio device, or presets for the audio being played on the audio device | | Additional control parameters (a)....(x) | |

FIG. 4

AUDIO SYSTEM CONTROL DEVICE

TECHNICAL FIELD

This disclosure generally relates to audio systems. More particularly, the disclosure relates to control devices for audio systems.

BACKGROUND

Conventional audio systems may present challenges for users in terms of content selection, initiating content, and/or playback control. These conventional systems and related approaches can limit the user experience.

SUMMARY

All examples and features mentioned below can be combined in any technically possible way.

Various implementations include devices and approaches for controlling an audio system. In particular cases, a device is used to control a remote audio device with a rotatable feature having distinct operating modes.

In some particular aspects, a device includes: a rotatable feature that can rotate in a first direction and a second direction opposite the first direction; at least one communication module for connecting to a remote audio device; and at least one processor configured to, in a first mode, provide input to the remote audio device to control a first aspect of audio being played on the remote audio device, wherein the input is a first input when the rotatable feature is rotated in the first direction in the first mode and the input is a second input different from the first input when the rotatable feature is rotated in the second direction in the first mode, and in a second mode different from the first mode, the second mode initiated by user input, provide the input to the remote audio device to control a second aspect of the audio being played on the remote audio device, the second aspect different from the first aspect, wherein the input is a third input different from the first and second inputs when the rotatable feature is rotated in the first direction in the second mode and the input is a fourth input different from the first, second, and third inputs when the rotatable feature is rotated in the second direction in the second mode.

In additional particular aspects, a method of controlling a remote audio device using a device having a rotatable feature that can rotate in a first direction and a second direction opposite the first direction includes: in a first mode, providing input to the remote audio device to control a first aspect of audio being played on the remote audio device, wherein the input is a first input when the rotatable feature is rotated in the first direction in the first mode and the input is a second input different from the first input when the rotatable feature is rotated in the second direction in the first mode, and in a second mode different from the first mode, the second mode initiated by user input, providing the input to the remote audio device to control a second aspect of the audio being played on the remote audio device, the second aspect different from the first aspect, wherein the input is a third input different from the first and second inputs when the rotatable feature is rotated in the first direction in the second mode and the input is a fourth input different from the first, second, and third inputs when the rotatable feature is rotated in the second direction in the second mode.

In further particular aspects, an audio device includes: a housing; a rotatable feature on the housing that can rotate in a first direction and a second direction opposite the first direction; an electro-acoustic transducer in the housing for providing an audio output; and at least one processor in the housing, the processor configured to, in a first mode, provide input to control a first aspect of audio being played by the transducer, wherein the input is a first input when the rotatable feature is rotated in the first direction in the first mode and the input is a second input different from the first input when the rotatable feature is rotated in the second direction in the first mode, and in a second mode different from the first mode, the second mode initiated by user input, provide the input to control a second aspect of the audio being played by the transducer, the second aspect different from the first aspect, wherein the input is a third input different from the first and second inputs when the rotatable feature is rotated in the first direction in the second mode and the input is a fourth input different from the first, second, and third inputs when the rotatable feature is rotated in the second direction in the second mode.

Implementations may include one of the following features, or any combination thereof.

In some cases, the at least one communication module includes a wireless communication module or a wired communication module for communicating with the remote audio device.

In certain aspects, the first mode enables control of at least one of, volume of audio playback, track forward or backward selection, channel forward or backward selection, or skip forward or backward selection.

In particular cases, the second mode enables control of at least one of, feedback about the audio being played on the remote audio device, beats per minute (BPM) of the audio being played on the remote audio device, grouping input for additional remote audio devices, genre of the audio being played on the remote audio device, energy level of the audio being played on the remote audio device, spatialization of the audio being played on the remote audio device, orchestration of the audio being played on the remote audio device, focal points of the audio being played on the remote audio device, or presets for the audio being played on the remote audio device.

In some aspects, the user input to initiate the second mode includes at least one of, pushing the rotatable feature, pushing and holding the rotatable feature, or pushing a separate button on the device.

In certain cases, the processor is configured to enable a third mode different from the first mode and the second mode, wherein the third mode is initiated by multi-factor actuation of the rotatable feature.

In particular implementations, the multi-factor actuation includes a double-press of the rotatable feature.

In some aspects, the processor is further configured to provide feedback on adjustments to at least one of a mode or an aspect of the audio.

In certain cases, the feedback includes at least one of, audible feedback, visual feedback or haptic feedback.

In particular implementations, a type of the feedback differs based on mode.

In some cases, the device is configured to be paired with the remote audio device at initial setup of the device.

In certain aspects, the device is configured to pair with additional remote audio devices to coordinate grouping of audio output.

In some implementations, the device is configured to pair with the remote audio device at the initial setup of the device using a software application.

In some cases, after initial setup of the device using the software application, the device is configured to function as the sole controller for audio output at the remote audio device.

In particular aspects, the at least one processor is configured to enable browsing between distinct selections of, audio content source, audio genre or sub-genre, volume setting, or speaker grouping.

In certain implementations, the first aspect of the audio being played and the second aspect of the audio being played are adjustable without interrupting the audio being played on the remote device.

In particular cases, the remote audio device includes an amplifier.

In some aspects, the rotatable feature is a physical interface control.

In certain implementations, the processor is configured to control the first aspect of the audio being played at the remote audio device or the second aspect of the audio being played at the remote audio device only while the audio is being played at the remote audio device.

In some aspects, the device is configured to be paired with the remote audio device at initial setup of the device, and the rotatable feature is a physical interface control.

In particular cases, the audio device includes at least one communication module coupled with the processor and including a wireless communication module for communicating with additional audio devices in a grouping.

In some cases, the audio device includes an interface coupled with the processor, where the processor is further configured to provide feedback on adjustments to at least one of a mode or an aspect of the audio at the interface.

Two or more features described in this disclosure, including those described in this summary section, may be combined to form implementations not specifically described herein.

The details of one or more implementations are set forth in the accompanying drawings and the description below. Other features, objects and advantages will be apparent from the description and drawings, and from the claims.

BRIEF DESCRIPTION OF THE DRAWINGS

FIG. 4 is an example of a control chart for controlling operation of an audio device using the rotatable feature of a device according to various implementations.

Figure 1:
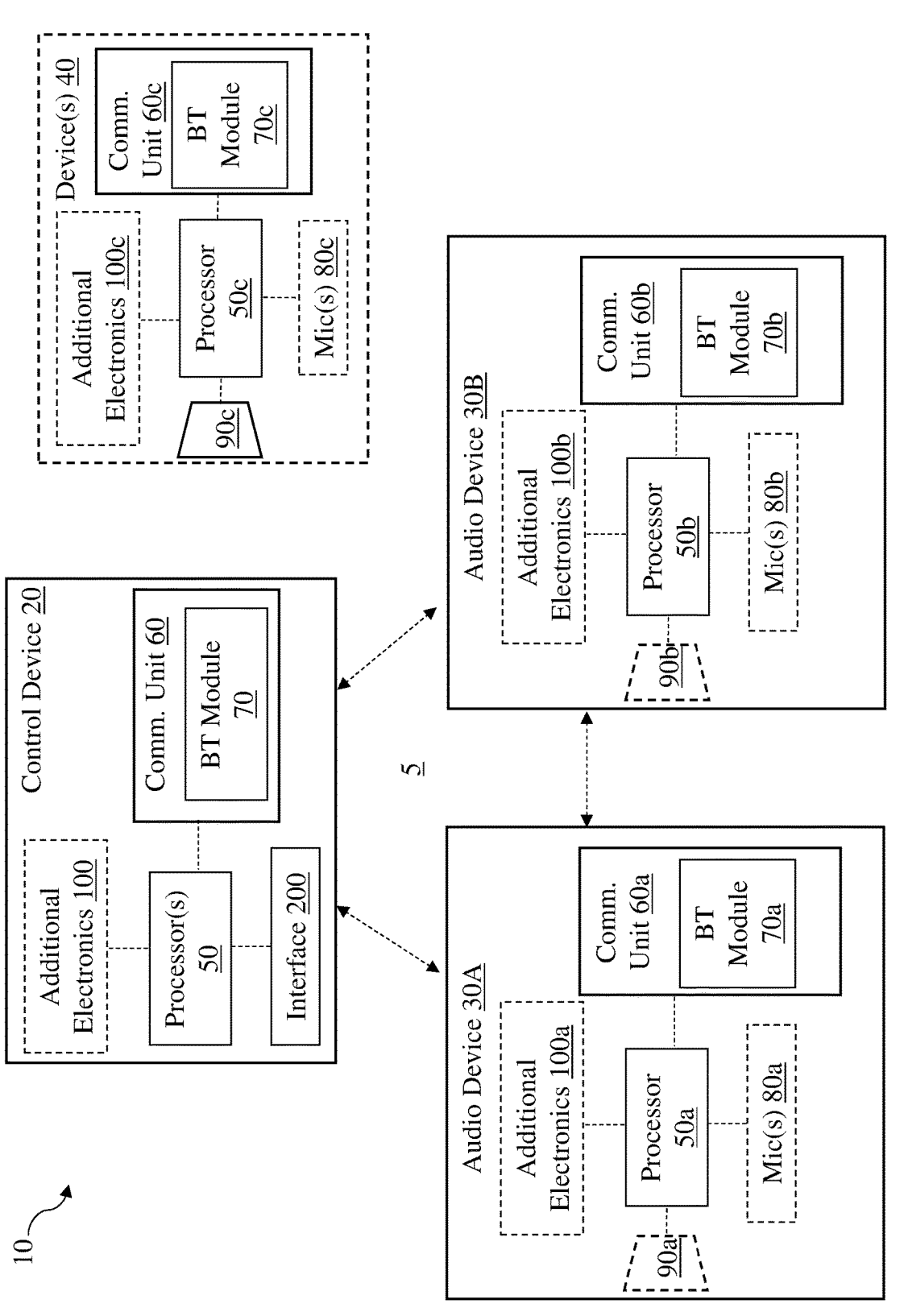
FIG. 1 is a block diagram of a system including a control device and at least one audio device, according to various disclosed implementations.

It is noted that the drawings of the various implementations are not necessarily to scale. The drawings are intended to depict only typical aspects of the disclosure, and therefore should not be considered as limiting the scope of the implementations. In the drawings, like numbering represents like elements between the drawings.

DETAILED DESCRIPTION

This disclosure is based, at least in part, on the realization that a device with a rotatable feature and multiple operating modes can be used to control a remote audio device, enhancing user experiences.

Conventional audio systems may present challenges for users in terms of content selection, initiating content, and/or playback control. For example, browsing content using conventional voice assistant interfaces can be cumbersome and time consuming. Browsing content with smartphone or app-based interfaces can be overwhelming due to the quantity of content, and can also lead to distraction from other applications. Initiating content, such as playback or streaming of audio content, can be challenging when the audio system includes multiple speakers. Further, playback control (e.g., volume adjustment, pausing, resuming, etc.) and content changes (e.g., next track, switching streams, etc.) are commonly not included in the same interface or are otherwise limited by location and/or space on a common interface.

In contrast to conventional approaches and systems, various implementations include a device with a rotatable feature that can rotate in a first direction and in a second, opposite direction, and also enable multi-modal control of aspects of audio played at a remote audio device. In particular cases, the rotatable feature includes a physical interface control. In certain examples, aspects of the audio being played are adjustable without interrupting the audio being played on the remote audio device. In particular cases, the device is configured to be paired with the remote audio device at initial setup of the device. The rotatable feature on the device can provide an efficient, effective means to adjust the aspects of the audio played at the remote audio device. In certain cases, the rotatable feature provides a single interface for multi-modal adjustment, streamlining the user experience when compared with conventional approaches and systems.

Commonly labeled components in the FIGURES are considered to be substantially equivalent components for the purposes of illustration, and redundant discussion of those components is omitted for clarity.

FIG. 1 shows an example of a space 5 including a system 10 including a set of devices according to various implementations. In various implementations, the devices shown in system 10 include a control device (or simply, device) 20 and an audio device 30 that is remote from the control device 20, e.g., not commonly housed with the control device 20. As described herein, in various implementations, the control device 20 is physically separate (or, remote) from the audio device 30. However, in other implementations described further herein, features of the control device 20 can be integrated in the audio device 30, e.g., in a common housing.

In certain cases, the space 5 includes a plurality of audio devices 30A, 30B, etc., that are capable of being controlled by device 20. For example, device 20 can be configured to selectively control one or more audio devices 30A, 30B, etc., in a space 5. In addition to audio devices 30A, 30B, one or more additional device(s) 40 are shown, which are optional in some implementations. The additional device(s) 40 can be configured to communicate with the control device 20, audio device(s) 30 and/or other electronic devices in the space 5 using any communications protocol or approach described herein. In certain aspects, the system 10 is located in or around space 5, e.g., an enclosed or partially enclosed room in a home, office, theater, sporting or entertainment venue, religious venue, etc. In some cases, the space 5 has one or more walls and a ceiling. In other cases, the space 5 includes an open-air venue that lacks walls and/or a ceiling.

Figures 2, 3:
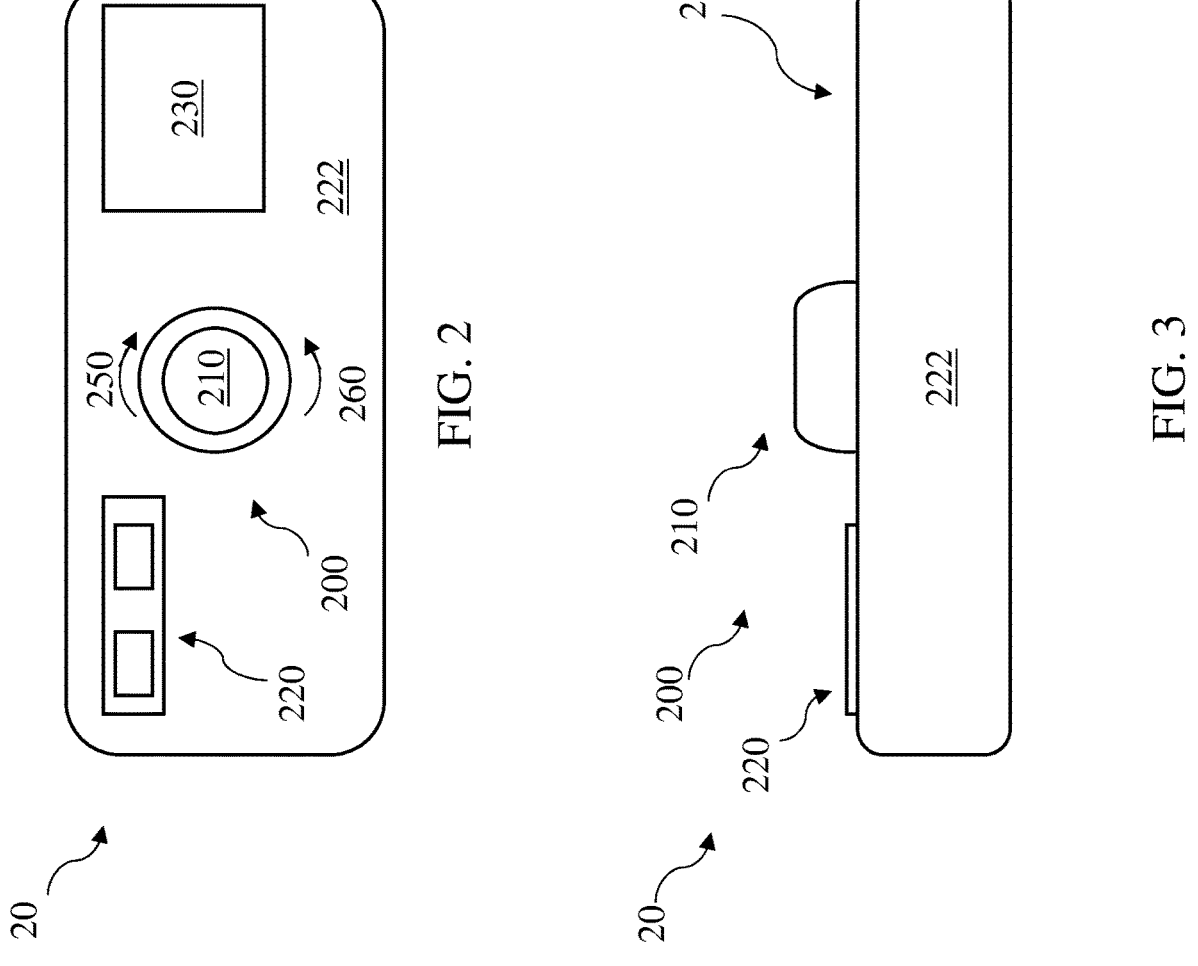
FIG. 2 is a top view of an example control device according to various implementations.
FIG. 3 is a side view of the control device in FIG. 2.

In certain cases, the control device 20 includes one or more processors (or, controllers) 50 and a communication (comm.) unit 60 coupled with the controller 50. In certain examples, the communication unit 60 includes a Bluetooth module 70 (e.g., including a Bluetooth radio), enabling communication with other devices over Bluetooth protocol. In certain example implementations, control device 20 can also include an interface 200 having a rotatable feature for enabling control functions. FIG. 2 illustrates one example of an interface 200 including a rotatable feature 210 according to various implementations. Additional aspects of the rotatable feature 210 are described further herein.

Returning to FIG. 1, in addition to processor(s) 50*a*, 50*b*, 50*c*, the audio devices 30 can also include one or more microphones 80 (e.g., a microphone array), and a transducer 90 (e.g., an electro-acoustic transducer) for providing an audio output, e.g., in space 5. Further, the control device 20, audio device(s) 3, and/or additional device 40 can also include additional electronics 100, such as a power manager and/or power source (e.g., battery or power connector), memory, sensors (e.g., IMUs, accelerometers/gyroscope/magnetometers, optical sensors, voice activity detection systems), etc. In some cases, the memory may include a flash memory and/or non-volatile random access memory (NVRAM). In particular cases, memory stores: a microcode of a program for processing and controlling the processor(s) 50 and a variety of reference data; data generated during execution of any of the variety of programs performed by the processor(s) 50; a Bluetooth connection process; and/or various updateable data for safekeeping such as paired device data, connection data, device contact information, etc. Certain of the above-noted components depicted in FIG. 1 are optional, and are displayed in phantom. For example, in some cases, audio device(s) 30 need not necessarily include a transducer 90. In such cases, the audio device(s) 30 can include an amplifier (e.g., in additional electronics 100) configured to amplify an audio signal for output at an additional device (e.g., audio device 30B, device 40, etc.).

In certain cases, the processor(s) 50 can include one or more microcontrollers or processors having a digital signal processor (DSP). In some cases, the processor(s) 50 are referred to as processing circuit(s) or control circuit(s). The processor(s) 50 may be implemented as a chipset of chips that include separate and multiple analog and digital processors.

In particular cases, the processor(s) 50 may provide, for example, for coordination of other components of the device 20, such as control of user interface 200 and applications run by the device 20. In various implementations, processor(s) 50 in device 20 include a remote audio device control module which can include software and/or hardware for performing control processes described herein. For example, processor(s) 50 can include a remote audio device control module in the form of a software stack having instructions for controlling functions in outputting audio to one or more speakers in the system 10 according to any implementation described herein.

The communication unit 60 can include the BT module 70 configured to employ a wireless communication protocol such as Bluetooth, along with additional network interface (s) such as those employing one or more additional wireless communication protocols such as IEEE 802.11, Bluetooth Low Energy, or other local area network (LAN) or personal area network (PAN) protocols such as Wi-Fi. In particular implementations, communication unit 60 is particularly suited to communicate with other communication units 60 in audio devices 30 and/or additional device(s) 40 via Bluetooth. In still further implementations, the communication unit 60 is configured to communicate with any other device in the system 10 wirelessly via one or more of: Bluetooth (BT); BT low-energy (LE) audio; broadcast such as via synchronized unicast; a synchronized downmixed audio connection over BT or other wireless connection (also referred to as SimpleSync™, a proprietary connection protocol from Bose Corporation, Framingham, MA, USA); and multiple transmission streams such as broadcast. In still further implementations, the communication unit 60 is configured to communicate with any other device in the system 10 via additional wireless communication approaches (e.g., Wi-Fi, RF) and/or a hard-wired connection, e.g., between any two or more devices.

In certain example implementations, audio devices 30 and/or the additional device 40 can include similar components (e.g., a processor 50 and communications unit 60) as the control device 20. Further, those devices 30, 40 can include additional components that may not necessarily be present at the control device 20 (e.g., a transducer 90 and microphone(s) 80). In certain cases, distinct audio devices 30A, 30B can include distinct speakers in the space 5, and in particular cases, can include one or more portable speakers in the space 5.

FIG. 2 shows a top view of the interface 200 on control device 20 including one non-limiting example of a rotatable feature 210 according to various implementations. FIG. 3 shows a side view of the control device 20 including the interface 200. The control device 20 can take any of a number of distinct form factors, and the depiction in FIGS. 2 and 3 is merely illustrated. In certain cases, additional button(s) 220 and/or displays 230 (e.g., touch screen or visual displays) are located on the interface 200 for enabling control and/or feedback relating to functions of the control device 20. As shown, in certain implementations, the rotatable feature 210 is a physical interface control, for example, a three-dimensional (3D), tangible control feature. In certain cases, the rotatable feature 210 has an approximately circular shape, and in more particular cases, can resemble a dial or knob. In various implementations, the rotatable feature 210 protrudes from a housing 222 of the control device 20, and is located on one or more faces of the housing 222.

In still further implementations, the rotatable feature 210 is included in a touch interface such as a capacitive touch interface. In such examples, the rotatable feature 210 can be part of a capacitive touch surface with a defined ring, dial, or knob. In a particular example, the capacitive touch surface defines a grooved arc or ring, that the user can run her finger along to actuate functions defined herein. For example, the user can actuate the rotatable feature 210 in a planar (e.g., capacitive touch interface) by running one or more fingers along the arc or ring in a clockwise or counterclockwise direction.

As described herein, the processor 50 at the control device 20 is configured to provide distinct inputs to the remote audio device (e.g., device(s) 30) to control aspects of audio being played at the audio device(s) 30. FIG. 4 is an example schematic depiction of a control chart 300 illustrating simplified control parameters for the control device 20 according to distinct modes and actions at the rotatable feature 210. With reference to FIGS. 1-4, in particular cases, the processor 50 is configured to operate in at least two distinct modes to control aspects of audio being played at audio device(s) 30. In a first mode (I): the processor 50 provides input to the remote audio device 30 to control a first aspect of audio being played on the remote audio device 30. With reference to FIGS. 2 and 3, in the first mode (I), the input is a first input (i) when the rotatable feature 210 is rotated in the first direction 250, and the input is a second input (ii) different from the first input (i) when the rotatable feature 210 is rotated in the second direction 260. In some non-limiting examples, the first mode (I) enables control of at least one of: volume of audio playback, track forward or backward selection, channel forward or backward selection, or skip forward or backward selection.

In particular cases, the processor 50 is configured to operate in a second mode (II) based on (e.g., initiated by) user input, e.g., at the rotatable feature 210. For example, the user input to initiate the second mode can include at least one of: pushing the rotatable feature 210, pushing and holding the rotatable feature 210, or pushing a separate button 220 (or an interface 230 interaction) on the device 20. In certain aspects, the rotatable feature 210 is configured to depress to enable pushing and/or pushing and holding, and in some cases, provides tactile, visual, and/or audible feedback. In various particular implementations, when operating in the first mode (I), user input is required to initiate the second mode (II).

As noted herein, the second mode (II) is different from the first mode, and enables control of at least one distinct aspect of audio played at the audio device 30. In various implementations, the processor 50 is configured in the second mode (II), to provide a third input (iii) to the audio device 30 to control a second aspect of the audio being played on the audio device 30. As noted herein, the second aspect of the audio is different from the first aspect. Further, the third input (iii) is different from the first (i) and second (ii) inputs when the rotatable feature 210 is rotated in the first direction 250 in the second mode (II). When operating in the second mode (II) the input is a fourth input (iv) different from the first (i), second (ii), and third (iii) inputs when the rotatable feature 210 is rotated in the second direction 250.

In some non-limiting examples, the second mode (II) enables control of at least one of: feedback about the audio being played on the audio device 30, beats per minute (BPM) of the audio being played on the audio device 30, grouping input for additional audio devices 30, genre of the audio being played on the audio device 30, energy level of the audio being played on the audio device 30, spatialization of the audio being played on the audio device 30, orchestration of the audio being played on the audio device 30, focal points of the audio being played on the audio device 30, or presets for the audio being played on the audio device 30.

Examples of feedback about the audio being played on the audio device 30 can include a "like," or positive feedback (e.g., with a clockwise movement such as in the first direction 250) and a "dislike," or negative feedback (e.g., with a counter-clockwise movement such as in the second direction 260). Examples of BPM adjustment can include an increase in BPM (e.g., with a clockwise movement such as in the first direction 250) and a decrease in BPM (e.g., with a counter-clockwise movement such as in the second direction 260). Examples of grouping input can include adding an audio device 30 to a grouping (e.g., with a clockwise movement such as in the first direction 250) and removing an audio device 30 from a grouping (e.g., with a counter-clockwise movement such as in the second direction 260), cycling through additional audio devices 30 to add to a grouping with a forward (e.g., clockwise) movement such as in the first direction 250, and/or audio output settings-based adjustment for a group of audio devices 30.

In a non-limiting example of grouping input, an audio device (e.g., audio device 30B) can be added to a group or removed from a group with an interface command such as via the rotatable feature 210. In one such example, a first audio device 30A is outputting audio in a space 5 and a user wishes to add another audio device 30B to a group with the first audio device 30A. In this example, the user can actuate the rotatable feature 210, e.g., rotate the rotatable feature 210 in a clockwise direction coinciding with increasing volume, and in response, the control device 20 causes the volume at audio device 30A to increase and also causes audio device 30B to join the group including audio device 30A and output audio at the same volume. In another example, the user can actuate the rotatable feature 210 on an audio device 30B in a group to exit a grouping, e.g., by turning the rotatable feature 210 in a counterclockwise direction coinciding with decreasing volume. When the user turns the rotatable feature 210 past a threshold (e.g., to zero volume), the control device 20 stops audio output at audio device 30B and removes the audio device 30B from the grouping (e.g., un-grouping audio devices 30B and 30A).

Examples of orchestration adjustment can include: adjusting channel assignment of a first audio device 30A when a second audio device 30B is introduced in the space 5 (e.g., when second audio device 30B is detected in the proximity of the control device 20). In a particular example, control device 20 defines a first channel assignment to the first audio device 30A (e.g., center channel), and in response to detecting the second audio device 30B in the space 5 (or, another trigger described herein), the control device 20 adjusts the channel assignment for the first audio device 30A (e.g., to left channel), and assigns a distinct channel to the second audio device 30B (e.g., right channel). In certain of these cases, the control device 20 enables proximity-based triggering, e.g., such as automatic channel adjustment based on detecting proximity of the audio device(s) 30 to the control device 20. In additional cases, channel assignment can be controlled by actuation of the control device 20 (e.g., at interface 200), for example, by enabling scrolling between distinct channel assignments.

In still further implementations, the interface 200 can control orchestration of a speaker (e.g., a first audio device 30A) as well other audio devices (e.g., audio device 30B) in a group. For example, the interface 200 can enable control of whether a first audio device 30A is playing independently (e.g., in party mode), or is playing a channel or subset of channels in a grouping of audio devices (e.g., including audio device(s) 30B, 30C, etc.), without impacting other audio devices in the group. Additionally or alternatively, the interface 200 can enable control of whether the group of audio devices to which an audio device 30A is playing is presented in a party mode (e.g., each playing independently), or playing in an immersivity orchestrated group (e.g., a stereo pair or stereo group).

Examples of audio output settings-based adjustment for a group of audio devices 30 can include a setting-for-grouping function that enables adding an audio device 30 to one or more speakers to define or expand a group via an audio settings adjustment (e.g., on the audio device to be added or on control device 20). A particular example can include a volume-for-grouping function. In this example, a first audio device 30A is outputting audio while a second audio device 30B in the space 5 is not outputting audio. In response to an interface command (e.g., at interface 200 on the control device 20, or an interface at the second audio device 30B), the controller 20 groups the first and second audio devices 30A, 30B, and initiates output at the second audio device 30B at the same volume as the first audio device 30A. From the user's perspective, adding the second audio device 30B to the grouping appears to turn up the volume of the audio output at that second audio device 30B to match the audio output at the first audio device 30A. It is understood that any of the control functions described with reference to the second mode (II) can be controlled in the first mode (I), and vice versa.

In other examples, the processor 50 (via control by rotatable feature 210) is configured to enable browsing between particular aspects of the audio output such as in smaller, discrete groups of aspects. For example, the processor 50 (via control by rotatable feature 210) can be configured to enable browsing between distinct selections of, audio content source, audio genre or sub-genre, volume setting, or speaker grouping.

In still further implementations, as illustrated in FIG. 4, the processor 50 is configured to enable a third mode (III) that is different from the first mode (I) and the second mode (II). In certain cases, the third mode (III) can enable controlling a third aspect of the audio output at the audio device 30, e.g., via one or more additional control parameters. In certain examples, the third mode (III) is initiated by a multi-factor actuation of the rotatable feature 210 (FIGS. 2, 3). For example, multi-factor actuation can include a double-press of the rotatable feature 210, a double-tap of the rotatable feature 210, a press-and-turn of the rotatable feature 210, etc.

As noted herein, while various modes (e.g., first (I), second (II), and third (III) modes) are described as enabling control of particular aspects of audio output, it is understood that any of the aspects of audio output described with reference to one mode can be controlled in other modes, and vice versa. For example, grouping input or orchestration (described in examples relative to second mode (II)) can be controlled in the first mode (I) in various implementations.

As noted herein, the processor 50 can be configured to provide feedback on the adjustment(s) to the mode and/or aspect(s) of the audio output. In particular examples, the processor 50 provides feedback at the device 20. For example, the processor 50 can provide feedback at the device 20 in the form of audible feedback (e.g., via an audible click or a chime played at a transducer when actuating the rotatable feature 210), visual feedback (e.g., a change in lighting displayed at the device 20), and/or haptic feedback (e.g., a click, notch, or pushback in adjustment of the rotatable feature 210). In certain cases, the type of feedback differs based on mode. For example, feedback can vary based on mode, such that different feedback in the first and second modes can help a user differentiate in which mode they are operating. This differential feedback can be beneficial, e.g., where user input to enter the second mode is a push of the rotatable feature 210.

In particular cases, adjusting the first aspect of the audio and/or the second aspect of the audio is performed without interrupting the audio being played on the audio device 30. In certain cases, adjusting the first and/or second aspect of the audio is performed while maintaining the volume of the audio playback at audio device 30, continuing playback of the audio at audio device 30, ducking the audio in or out (e.g., ducking out a first stream and ducking in a second stream), and/or in parallel (or radio-style) streams of audio output at a same volume and switched using the actuation via rotatable feature 210.

In further implementations, the processor 50 is configured to control the first aspect of the audio being played at the audio device 30 or the second aspect of the audio being played at the audio device 30 only while the audio is being played at the audio device 30. In these particular cases, the device 20 can be used for audio output control at the audio device 30 only during output of audio at the audio device 30. For example, the audio device 30 can be powered on or playback otherwise initiated using an interface control at the audio device 30 (e.g., voice activation, power on/off button, etc.), while aspects of audio output can be controlled by the device 20 during output. In still further cases, the device 20 is also configured to power on/off the audio device 30 or otherwise initiate audio output at the audio device 30, in addition to controlling audio output at the audio device 30.

Returning to FIG. 1, in various implementations, the device 20 is configured to be paired with the audio device 30 at initial setup of the device 20. Pairing can be performed via any wireless approach described herein (e.g., wireless pairing based on Wi-Fi, RF, BT and/or BLE), and/or via a hard-wired pairing approach such as a setup pairing via a hard-wired connection such as a variation of Universal Serial Bus (USB), High Definition Multimedia Interface (HDMI), etc. In particular cases, the device 20 is configured to pair with additional audio devices (e.g., audio devices 30B, additional device 40, etc.) to coordinate grouping of audio output, e.g., across two or more audio devices in space 5. In some cases, the device is configured to pair with the audio device(s) 30 at initial setup using a software application (or, "app") such as one running on an additional device 40, e.g., a smartphone, tablet, smart home controller, etc. In certain of these cases, after initial setup of the device 20 using the software application, the device 20 is configured to function as the sole controller for audio output at the audio device(s) 30. That is, the device 20 can be used as the audio controller for device(s) 30 without requiring use of an application or another device (e.g., smartphone or tablet). The device 20 can be used to control a plurality of audio devices 30 in space 5 without requiring intervening control by a smartphone, tablet, etc., or without a corresponding app.

As noted herein, aspects of the device 20 can be integrated into an audio device 30, e.g., an interface at the audio device 30. In such cases, the rotatable feature 210 (and in some cases, additional aspects of the interface 200) can be integrated into the interface at audio device 30 to control audio output at that device 30. In certain examples, the rotatable feature 210 (and in some cases, additional aspects of the interface 200) can be integrated into the housing of an audio device 30, such as on a top or side of the audio device housing. Further, one or more audio devices 30 with interface controls such as the rotatable feature 210 can be used to control audio output (e.g., grouping, surround, orchestration, etc.) among a group of audio devices 30 in space 5.

In any case, the approaches described according to various implementations have the technical effect of enhancing audio control for a user in an environment with a single interface device. The rotatable feature on the devices according to various implementations can provide an efficient, effective means to adjust the aspects of the audio played at the remote audio device(s). In certain cases, the rotatable feature provides a single interface for multi-modal adjustment, streamlining the user experience when compared with conventional approaches and systems.

Various wireless connection scenarios are described herein. It is understood that any number of wireless connection and/or communication protocols can be used to couple devices in a space, e.g., space 5 (FIG. 1). Examples of wireless connection scenarios and triggers for connecting wireless devices are described in further detail in U.S. patent application Ser. No. 17/714,253 (filed on Apr. 4, 2022) and Ser. No. 17/314,270 (filed on May 7, 2021), each of which is hereby incorporated by reference in its entirety).

It is further understood that any RF protocol could be used to communicate between devices according to implementations, including Bluetooth, Wi-Fi, or other proprietary or non-proprietary protocols. In implementations that utilize Bluetooth LE Audio, a unicast topology could be used for a one-to-one connection between speakers and/or devices in space 5. In some implementations, an LE Audio broadcast topology (such as Broadcast Audio) could be used to transmit one or more sets of audio data to multiple sets of speakers.

The above description provides embodiments that are compatible with BLUETOOTH SPECIFICATION Version 5.2 [Vol 0], 31 Dec. 2019, as well as any previous version(s), e.g., version 4.x and 5.x devices. Additionally, the connection techniques described herein could be used for Bluetooth LE Audio, such as to help establish a unicast connection. Further, it should be understood that the approach is equally applicable to other wireless protocols (e.g., non-Bluetooth, future versions of Bluetooth, and so forth) in which communication channels are selectively established between pairs of stations. Further, although certain embodiments are described above as not requiring manual intervention to initiate pairing, in some embodiments manual intervention may be required to complete the pairing (e.g., "Are you sure?" presented to a user of the source/host device), for instance to provide further security aspects to the approach.

In some implementations, the host-based elements of the approach are implemented in a software module (e.g., an "App") that is downloaded and installed on the source/host (e.g., a "smartphone"), in order to provide the coordinated audio output aspects according to the approaches described above.

While the above describes a particular order of operations performed by certain implementations of the invention, it should be understood that such order is illustrative, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

The functionality described herein, or portions thereof, and its various modifications (hereinafter "the functions") can be implemented, at least in part, via a computer program product, e.g., a computer program tangibly embodied in an information carrier, such as one or more non-transitory machine-readable media, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the functions can be performed by one or more programmable processors executing one or more computer programs to perform the functions of the calibration process. All or part of the functions can be implemented as, special purpose logic circuitry, e.g., an FPGA and/or an ASIC (application-specific integrated circuit). Processors suitable for the execution of a computer program include, by way of example, both general and special purpose microprocessors, and any one or more processors of any kind of digital computer. Generally, a processor will receive instructions and data from a read-only memory or a random access memory or both. Components of a computer include a processor for executing instructions and one or more memory devices for storing instructions and data.

In various implementations, unless otherwise noted, electronic components described as being "coupled" can be linked via conventional hard-wired and/or wireless means such that these electronic components can communicate data with one another. Additionally, sub-components within a given component can be considered to be linked via conventional pathways, which may not necessarily be illustrated.

A number of implementations have been described. Nevertheless, it will be understood that additional modifications may be made without departing from the scope of the inventive concepts described herein, and, accordingly, other embodiments are within the scope of the following claims.

We claim:

1. A device comprising:
   a rotatable feature that can rotate in a first direction and a second direction opposite the first direction;
   at least one communication module for connecting to a remote audio device; and
   at least one processor configured to,
      in a first mode, provide input to the remote audio device to control a first aspect of audio being played on the remote audio device, wherein the input is a first input when the rotatable feature is rotated in the first direction in the first mode and the input is a second input different from the first input when the rotatable feature is rotated in the second direction in the first mode, and
      in a second mode different from the first mode, the second mode initiated by user input, provide the input to the remote audio device to control a second aspect of the audio being played on the remote audio device, the second aspect different from the first aspect, wherein the input is a third input different from the first and second inputs when the rotatable feature is rotated in the first direction in the second mode and the input is a fourth input different from the first, second, and third inputs when the rotatable feature is rotated in the second direction in the second mode,
      wherein the second mode enables control of grouping input for additional remote audio devices.

2. The device of claim 1, wherein the at least one communication module includes a wireless communication module or a wired communication module for communicating with the remote audio device.

3. The device of claim 1, wherein the first mode enables control of at least one of,
   volume of audio playback, track forward or backward selection, channel forward or backward selection, or skip forward or backward selection.

4. The device of claim 1, wherein the user input to initiate the second mode includes at least one of,
   pushing the rotatable feature, pushing and holding the rotatable feature, or pushing a separate button on the device.

5. The device of claim 4, wherein the processor is configured to enable a third mode different from the first mode and the second mode, wherein the third mode is initiated by multi-factor actuation of the rotatable feature, wherein the multi-factor actuation includes a double-press of the rotatable feature.

6. The device of claim 1, wherein the processor is further configured to provide feedback on adjustments to at least one of a mode or an aspect of the audio wherein the feedback includes at least one of, audible feedback, visual feedback or haptic feedback.

7. The device of claim 6, wherein a type of the feedback differs based on mode.

8. The device of claim 1, wherein the device is configured to be paired with the remote audio device at initial setup of the device.

9. The device of claim 8, wherein the device is configured to pair with additional remote audio devices to coordinate grouping of audio output.

10. The device of claim 8, wherein the device is configured to pair with the remote audio device at the initial setup of the device using a software application, wherein after initial setup of the device using the software application, the device is configured to function as the sole controller for audio output at the remote audio device.

11. The device of claim 1, wherein the at least one processor is configured to enable browsing between distinct selections of, audio content source, audio genre or sub-genre, volume setting, or speaker grouping.

12. The device of claim 1, wherein the first aspect of the audio being played and the second aspect of the audio being played are adjustable without interrupting the audio being played on the remote device.

13. The device of claim 1, wherein the remote audio device includes an amplifier.

14. The device of claim 1, wherein the rotatable feature is a physical interface control.

15. The device of claim 1, wherein the processor is configured to control the first aspect of the audio being played at the remote audio device or the second aspect of the audio being played at the remote audio device only while the audio is being played at the remote audio device.

16. The device of claim 1, wherein the second mode enables control of the grouping input for the additional remote audio devices, wherein while the remote audio device is outputting audio in a space, the at least one processor is configured to:
    i) in response to rotation of the rotatable feature in a first direction: add an additional remote audio device to a group including the remote audio device and initiate audio output at the additional remote audio device at a same volume as the audio output at the remote audio device, and
    ii) in response to rotation of the rotatable feature in a second direction: remove the additional remote audio device from the group including the remote audio device.

17. The device of claim 16, wherein the rotation of the rotatable feature coincides with a volume adjustment of the audio output at the remote audio device, wherein the additional remote audio device is not outputting audio prior to rotation of the rotatable feature in the first direction, and
  wherein the additional remote audio device stops outputting audio in response to removal from the group.

18. A method of controlling a remote audio device using a device having a rotatable feature that can rotate in a first direction and a second direction opposite the first direction, the method including:

in a first mode, providing input to the remote audio device to control a first aspect of audio being played on the remote audio device, wherein the input is a first input when the rotatable feature is rotated in the first direction in the first mode and the input is a second input different from the first input when the rotatable feature is rotated in the second direction in the first mode, and
  in a second mode different from the first mode, the second mode initiated by user input, providing the input to the remote audio device to control a second aspect of the audio being played on the remote audio device, the second aspect different from the first aspect, wherein the input is a third input different from the first and second inputs when the rotatable feature is rotated in the first direction in the second mode and the input is a fourth input different from the first, second, and third inputs when the rotatable feature is rotated in the second direction in the second mode,
  wherein the second mode enables control of grouping input for additional remote audio devices.

19. The method of claim 18, wherein the device is configured to be paired with the remote audio device at initial setup of the device, and wherein the rotatable feature is a physical interface control.

20. A device comprising:

a rotatable feature that can rotate in a first direction and a second direction opposite the first direction;
  at least one communication module for connecting to a remote audio device; and
  at least one processor configured to,
  in a first mode, provide input to the remote audio device to control a first aspect of audio being played on the remote audio device, wherein the input is a first input when the rotatable feature is rotated in the first direction in the first mode and the input is a second input different from the first input when the rotatable feature is rotated in the second direction in the first mode, and
  in a second mode different from the first mode, the second mode initiated by user input, provide the input to the remote audio device to control a second aspect of the audio being played on the remote audio device, the second aspect different from the first aspect, wherein the input is a third input different from the first and second inputs when the rotatable feature is rotated in the first direction in the second mode and the input is a fourth input different from the first, second, and third inputs when the rotatable feature is rotated in the second direction in the second mode, wherein the second mode enables control of orchestration of the audio played at the remote audio device by:
  in response to detecting an additional remote audio device in a same space as the remote audio device while the remote audio device is outputting audio, adjusting a channel assignment for the remote audio device and assigning a distinct channel to the additional remote audio device,
  wherein the rotatable feature enables scrolling between distinct channel assignments for at least one of the remote audio device or the additional remote audio device.

21. The device of claim 20, wherein the at least one communication module includes a wireless communication module or a wired communication module for communicating with the remote audio device.

* * * * *